(12) United States Patent
Kudoh

(10) Patent No.: US 8,023,212 B2
(45) Date of Patent: Sep. 20, 2011

(54) LENS BARREL AND IMAGE PICKUP APPARATUS

(75) Inventor: Tomoyuki Kudoh, Tokyo (JP)

(73) Assignee: Canon Kabushiki Kaisha (JP)

( * ) Notice: Subject to any disclaimer, the term of this patent is extended or adjusted under 35 U.S.C. 154(b) by 14 days.

(21) Appl. No.: 12/401,612

(22) Filed: Mar. 10, 2009

(65) Prior Publication Data

US 2009/0231736 A1    Sep. 17, 2009

(30) Foreign Application Priority Data

Mar. 11, 2008    (JP) .................................. 2008-061149

(51) Int. Cl.
*G02B 7/04* (2006.01)

(52) U.S. Cl. ........................................ 359/823; 359/819

(58) Field of Classification Search ........... 359/819–824
See application file for complete search history.

(56) References Cited

U.S. PATENT DOCUMENTS

| | | | |
|---|---|---|---|
| 5,262,898 A | 11/1993 | Nomura | |
| 5,343,331 A * | 8/1994 | Kohmoto et al. | 359/823 |
| 6,263,163 B1 | 7/2001 | Sasaki et al. | |
| 6,606,206 B2 | 8/2003 | Takeshita et al. | |
| 6,934,096 B1 | 8/2005 | Takeshita et al. | |
| 7,133,216 B2 | 11/2006 | Takeshita et al. | |
| 2002/0044363 A1 | 4/2002 | Takeshita et al. | |
| 2005/0243444 A1 | 11/2005 | Takeshita et al. | |

FOREIGN PATENT DOCUMENTS

| | | |
|---|---|---|
| JP | 2000-66081 A | 3/2000 |
| JP | 2001-324663 A | 11/2001 |
| JP | 2003-21776 A | 1/2003 |

OTHER PUBLICATIONS

Extended European Search Report dated Apr. 22, 2009, issued in corresponding European Application No. 09154764.6-2217.

\* cited by examiner

*Primary Examiner* — Darryl J Collins
(74) *Attorney, Agent, or Firm* — Rossi, Kimms & McDowell LLP

(57) ABSTRACT

A lens barrel capable of preventing reflection of rays of light from a rectilinear motion-causing restriction member on the inner surface of the lens barrel. In a photographic lens unit, to drive an actuator provided on a third lens unit, a flexible wiring board as a current carrying member is connected thereto. This flexible wiring board is disposed in a manner covering the inner surface of a rectilinear motion-causing restriction portion to prevent the same from being exposed toward the optical axis. Further, the flexible wiring board has a surface thereof toward the optical axis subjected to antireflection processing.

6 Claims, 12 Drawing Sheets

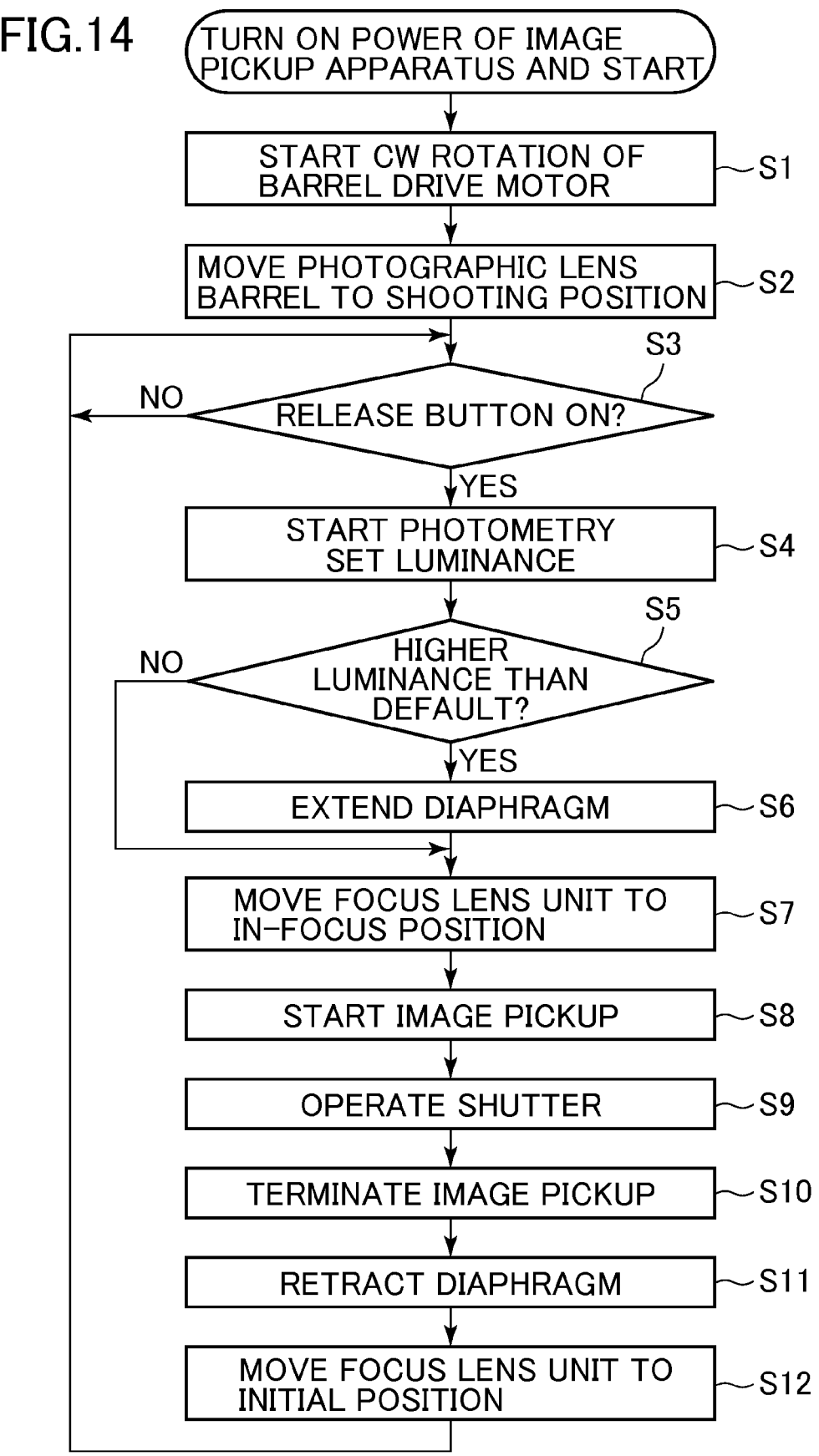

LENS BARREL AND IMAGE PICKUP APPARATUS

BACKGROUND OF THE INVENTION

1. Field of the Invention

The present invention relates to a lens barrel and an image pickup apparatus provided with the lens barrel.

2. Description of the Related Art

Conventionally, film cameras using a silver salt film have been in widespread use, but recently, digital cameras which are capable of capturing an image into a memory without using a film have sprung into wide use. These digital cameras include one provided with a zoom mechanism for moving a plurality of optical lenses along the optical axis to thereby change the photographing magnification.

Japanese Patent Laid-Open Publication No. 2001-324663 discloses an example of the construction of a zoom lens barrel. In this zoom lens barrel, a plurality of lens holding parts holding a plurality of lens are moved along the optical axis by a cam ring, and at the same time the motion of the lens holding parts in a direction of rotation is restricted by a rotation restricting part. With this construction, the optical lenses can be moved to a designated position.

In recent years, a rapid progress has been made toward a higher photographing magnification, and with this progress, the number of lens groups and the length of a lens barrel in its fully extended state tend to be increased, i.e. a zoom lens barrel tends to be increased in size. On the other hand, there is a strong demand for reduction of the thickness of a camera, and hence it is required to minimize the size of the zoom lens barrel in its retracted state. For the reduction of the thickness of a camera, it is envisaged to reduce the size of each of barrels of a zoom lens barrel in the optical axis direction and connect the barrels each having a reduced size such that the zoom lens barrel has a multi-stage construction with an increased number of barrels. For such reduction of camera thickness, there have already been proposed various methods.

Japanese Patent Laid-Open Publication No. 2000-66081 shows an example of a lens barrel using a prism-shaped metal for size reduction. With this construction, barrels of the lens barrel can be partially held by the metal key which is reduced in thickness such that they can be moved rectilinearly. A lens barrel of this type is more excellent in space efficiency than a conventional lens barrel held by a plastic molded barrel for rectilinear motion, and therefore it is suitable for size reduction.

Further, Japanese Patent Laid-Open Publication No. 2003-21776 shows an example of a lens barrel having cam barrels connected in multiple stages. In this case as well, barrels of the lens barrel are partially held for rectilinear motion by a thin metal key, and therefore a lens barrel of this type is also suitable for size reduction.

In the case of the lens barrels disclosed in the above-mentioned Japanese Patent Laid-Open Publication No. 2000-66081 and Japanese Patent Laid-Open Publication No. 2003-21776, if a metal key for restriction to rectilinear motion is disposed on the inner peripheral surface of the lens barrel, rays of light having passed through the photographic lens are reflected from the metal key to form adverse effect-causing rays, which causes a phenomenon called "ghost". When this phenomenon is caused, an image different from an image which is actually picked up of an object appears in the output image, and hence it is required to prevent generation of "ghost".

As a preventive measure against the ghost, there has been proposed a method of directly applying antireflection coating to the metal key. In this case, it is required to properly apply the coating and obtain the antireflection effects. However, since the coating is performed on the metal surface, the resulting surface is sometimes still somewhat shiny, and it is difficult for the current techniques to fully prevent reflection of rays of light from the metal key. In view of these circumstances, a lens barrel is desired which is not only small-sized and thin, but also free from ghost.

SUMMARY OF THE INVENTION

The present invention provides a lens barrel and an image pickup apparatus which are capable of preventing reflection of rays of light from a rectilinear motion-causing restriction member on the inner surface of the lens barrel.

In a first aspect of the present invention, there is provided a lens barrel that is movable in an optical axis direction, comprising a lens unit configured to be movable in the optical axis direction, a rectilinear motion-causing restriction member disposed inside the lens barrel, the rectilinear motion-causing restriction member having a rectilinear motion-causing restriction portion for guiding the lens unit for rectilinear motion, an actuator section disposed inside the lens barrel, and a current carrying member connected to the actuator section, for supplying electric current thereto, wherein the current carrying member is disposed in a same phase concerning a direction of rotation about an axis of the lens barrel with the rectilinear motion-causing restriction portion, in a manner covering the rectilinear motion-causing restriction portion from an optical axis side.

In a second aspect of the present invention, there is provided an image pickup apparatus comprising a lens barrel that is movable in an optical axis direction, wherein the lens barrel comprises a lens unit configured to be movable in the optical axis direction, a rectilinear motion-causing restriction member disposed inside the lens barrel, the rectilinear motion-causing restriction member having a rectilinear motion-causing restriction portion for guiding the lens unit for rectilinear motion, an actuator section disposed inside the lens barrel, and a current carrying member connected to the actuator section, for supplying electric current thereto, wherein the current carrying member is disposed in a same phase concerning a direction of rotation about an axis of the lens barrel with the rectilinear motion-causing restriction portion, in a manner covering the rectilinear motion-causing restriction portion from an optical axis side.

According to the present invention, the current carrying member covers the rectilinear motion-causing restriction member disposed inside the lens barrel, from the optical axis side, and hence it is possible to prevent rays of light from being reflected the rectilinear motion-causing restriction member on the inner peripheral surface of the lens barrel. Further, since the current carrying member connected to the actuator section is used for the purpose of preventing reflection of rays of light, it is possible to dispense with an extra member provided for the purpose.

The features and advantages of the invention will become more apparent from the following detailed description taken in conjunction with the accompanying drawings.

BRIEF DESCRIPTION OF THE DRAWINGS

FIG. 14 is a flowchart of a process of operation of the digital camera provided with the photographic lens barrel, from power-on to termination of shooting.

DETAILED DESCRIPTION OF THE EMBODIMENTS

The present invention will now be described in detail below with reference to the accompanying drawings showing embodiments thereof. An image pickup apparatus according to the present embodiment is applied to a digital camera provided with a photographic lens barrel having a collapsible zoom mechanism which is capable of changing photographing magnification as desired.

Figure 1:
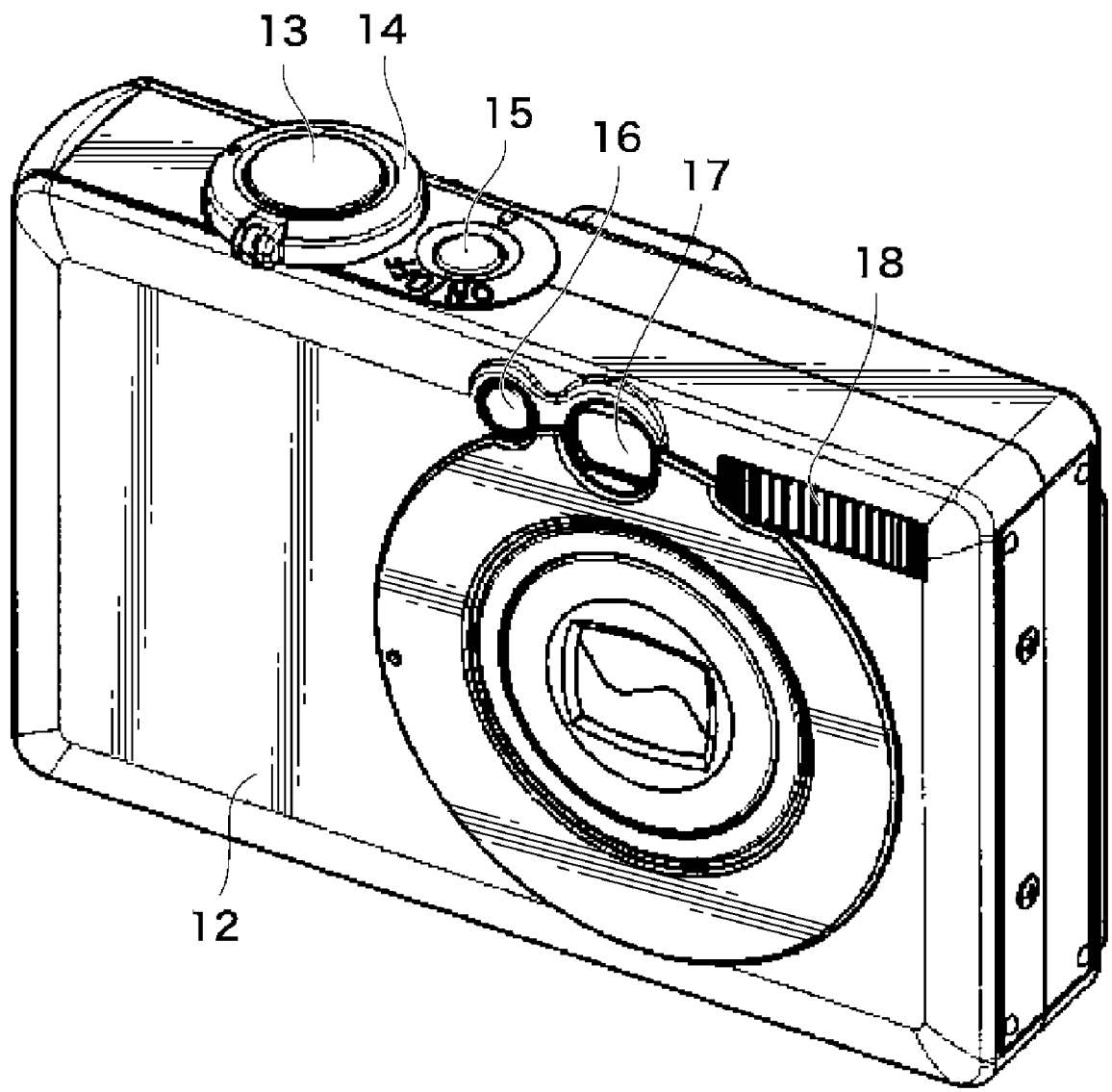
FIG. 1 is a perspective view of the appearance of a digital camera in a power-off state.
Figure 2:
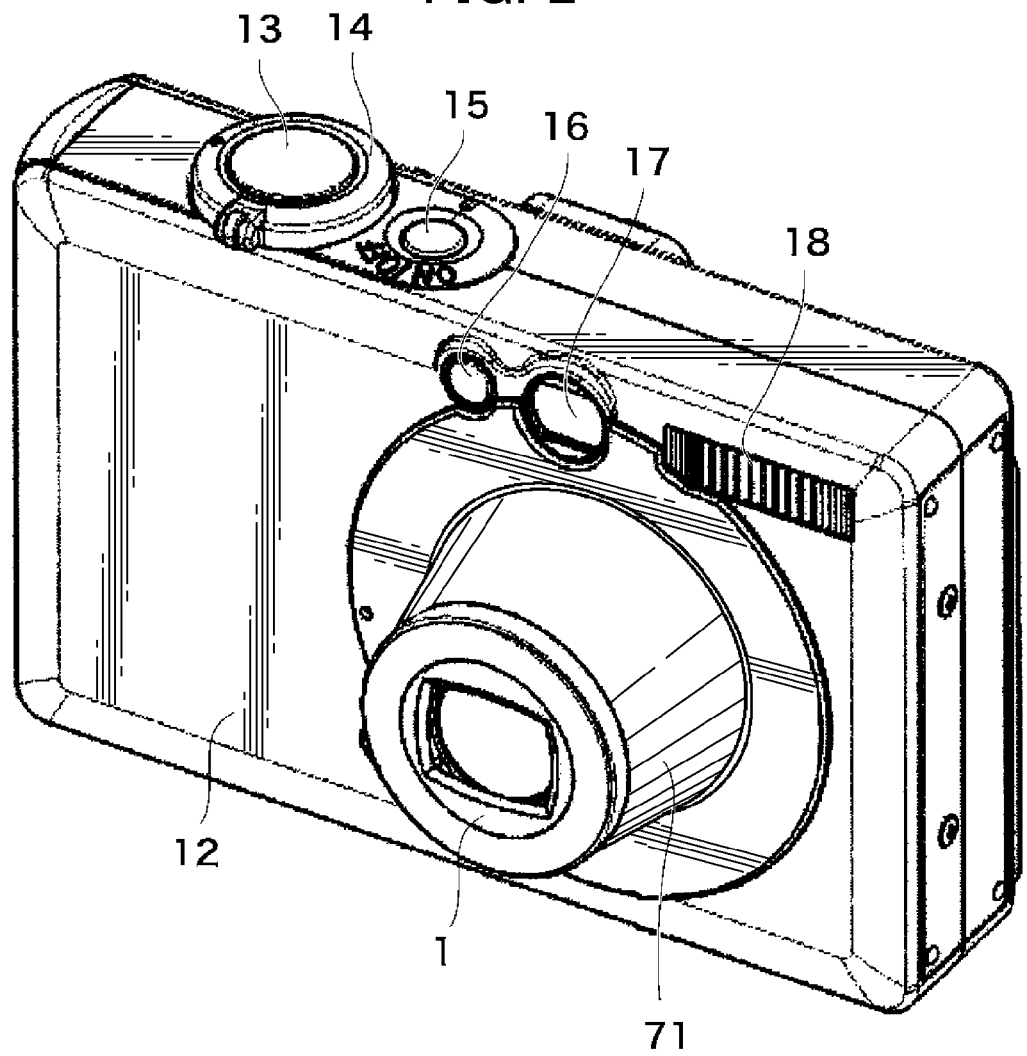
FIG. 2 is a perspective view of the appearance of the digital camera in a power-on state.
Figure 3:
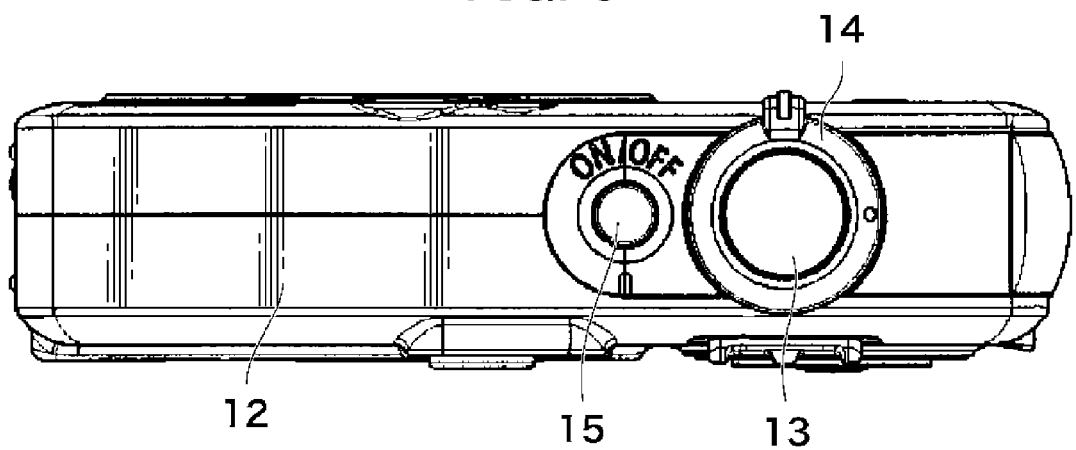
FIG. 3 is a top view of the digital camera.
Figure 4:
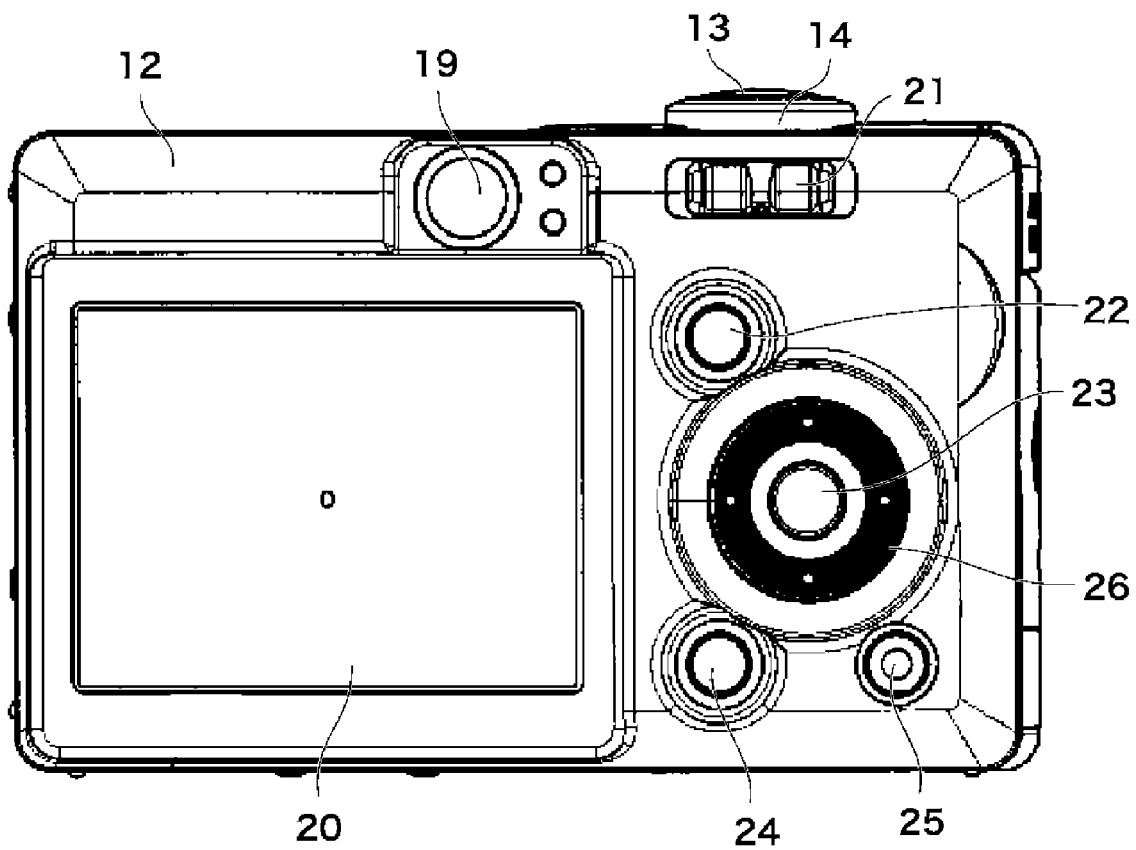
FIG. 4 is a rear view of the digital camera.
Figure 5:
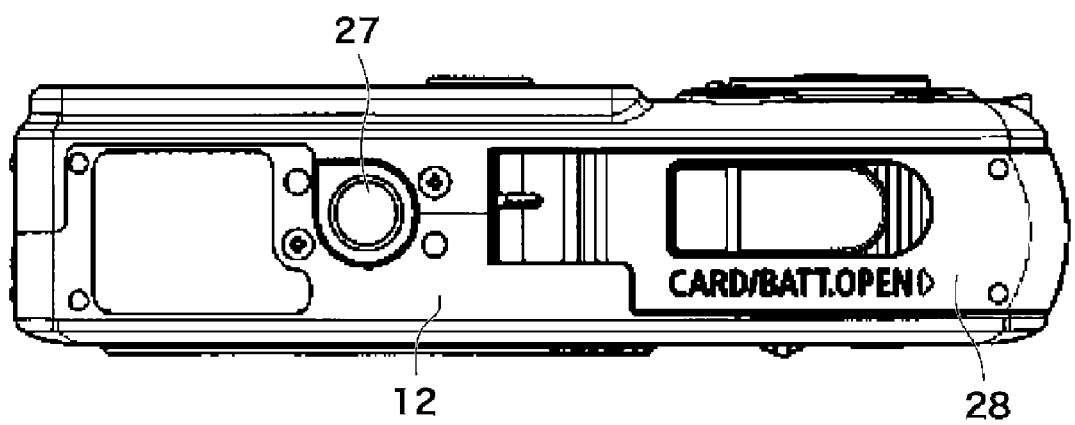
FIG. 5 is a bottom view of the digital camera.

FIG. 1 is a perspective view of the appearance of a digital camera 12 in a power-off state. FIG. 2 is a perspective view of the appearance of the digital camera 12 in a power-on state. FIG. 3 is a top view the digital camera 12. FIG. 4 is a rear view of the digital camera 12. FIG. 5 is a bottom view of the digital camera 12.

On the front surface of the digital camera 12, there are arranged a viewfinder 17 for determining a composition of an object, an auxiliary light source 16 for assisting a light source in photometry and ranging, a strobe 18, and a photographic lens barrel 71.

On the top surface of the digital camera 12, there are arranged a release button 13, a power supply switching button 15, and a zoom switch 14. On the bottom surface of the digital camera 12, there are arranged a tripod mounting part 27 and a card battery cover 28. A memory card drive 42, referred to hereinafter, and a battery inserting part (not shown) are disposed within the card battery cover 28.

Further, on the rear surface of the digital camera 12, there are arranged operation buttons 21, 22, 23, 24, 25, and 26 for switching of various functions, a display 20 implemented by an LCD, and a finder eyepiece 19. When one of the operation buttons 21, 22, 23, 24, 25, and 26 is pressed, an associated one of operation modes of the digital camera 12, such as a shooting mode, a reproduction mode, and a moving image shooting mode, is selected. The display 20 displays image data stored in a memory 40 or image data read from a memory card on a screen. Further, when the reproduction mode is selected, the display 20 reduces the image sizes of a plurality of picked-up image data and displays the reduced image data on the screen.

Figure 6:
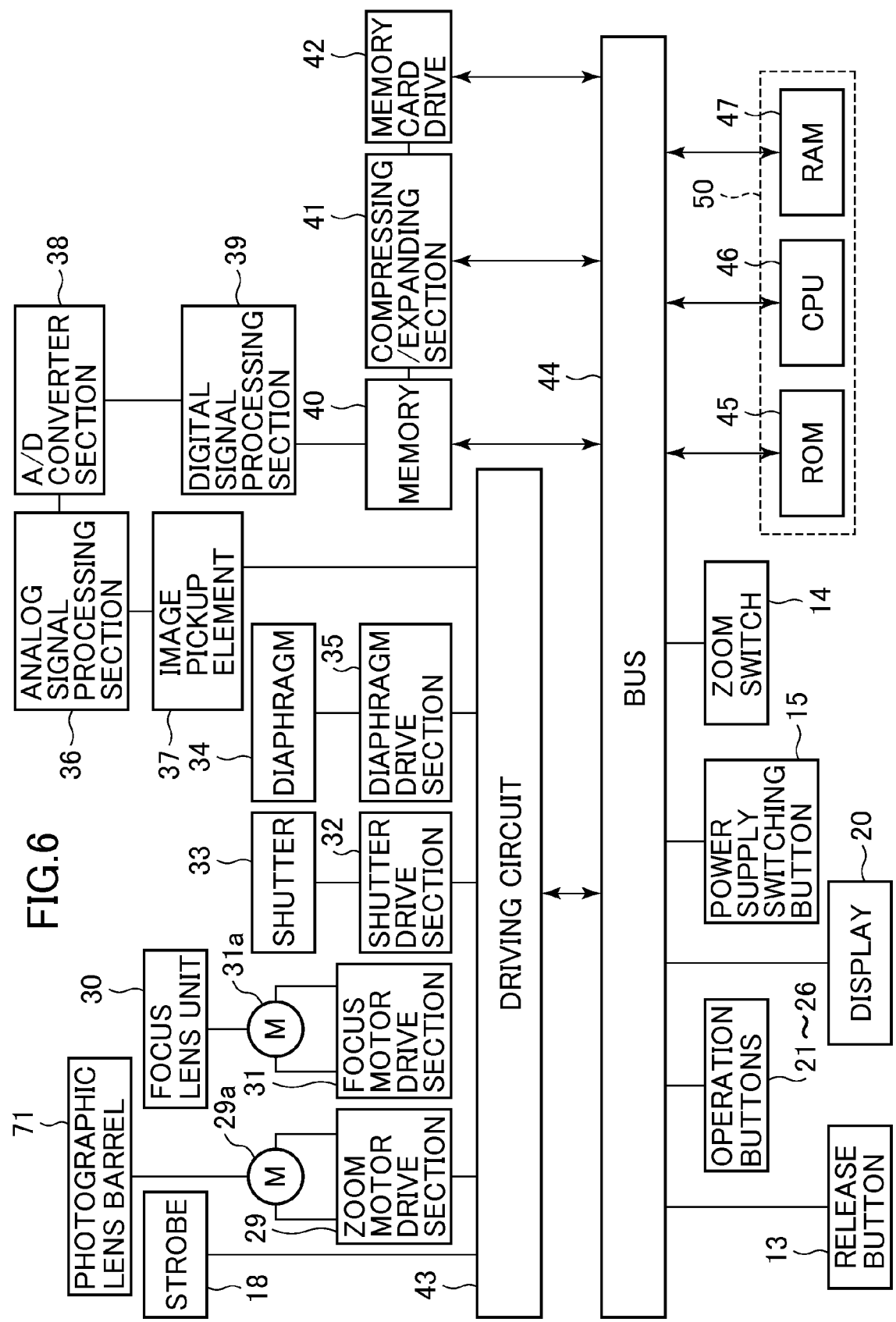
FIG. 6 is a block diagram of a controller of the digital camera and a peripheral circuit of the controller.

FIG. 6 is a block diagram of a controller of the digital camera 12 and a peripheral circuit of the controller. The controller 50 is basically comprised of a CPU 46, a ROM 45, and a RAM 47. The controller 50 is connected to the release button 13, the operation button 21 to 26, the display 20, the memory 40, the memory card drive 42, and other component elements, via a bus 44.

Further, a driving circuit 43 connected to the controller 50 via the bus 44 is connected to a zoom motor drive section 29, a focus motor drive section 31, a shutter drive section 32, a diaphragm drive section 35, an image pickup element 37 implemented by a CCD or a CMOS, and the strobe 18. The zoom motor drive section 29 drives a barrel drive motor 29a. The focus motor drive section 31 drives a focus motor 31a. These sections are drivingly controlled by signals from the controller 50. The ROM 45 stores control programs for controlling the above-mentioned various component elements. The RAM 47 stores data required for the control programs.

In the digital camera 12 constructed as above, when a user turns on its power supply by operating the power supply switching button 15, the CPU 46 reads out a necessary control program from the ROM 45 and starts an initial operation. More specifically, the controller 50 moves the photographic lens barrel 71 to a predetermined shooting-permitting area and starts up a photographing function, followed by entering a shooting standby state.

When the user presses the release button 13 for shooting, the controller 50 detects the brightness of an object by the image pickup element 37 and sets an aperture value and a shutter speed based on a photometric value obtained by the detection. Further, the controller 50 determines whether or not it is required to flash the strobe 18. The user can also operate the operation button 21 to thereby select in advance whether or not to forcibly flash the strobe 18.

Then, the controller 50 performs ranging to measure a distance to the object, and controls the focus motor drive section 31 to move a focus lens unit 30 to a predetermined focus position. The focus lens unit 30 is comprised of a photographic lens unit 1, a second lens unit 2, and a third lens unit 5, described hereinafter. Further, the controller 50 controls the shutter drive section 32 to open a shutter 33, thereby causing a desired image to be picked up by the image pickup element 37. Electrical charge corresponding to the amount of light that enters the image pickup element 37 according to an exposure control value is accumulated in the image pickup element 37, and the electrical charge is converted into an image signal, followed by being output to an analog signal processing section 36.

The analog signal processing section 36 carries out analog signal processing on the received image signal and then outputs the processed image signal to an A/D converter section 38. The A/D converter section 38 converts the received analog data of the processed image signal to digital data. Then, the digital data is output to a digital signal processing section 39 to be processed therein. Finally, the digital data is stored in the memory 40.

When the operation button 22 is operated, the digital data stored in the memory 40 is subjected to compression processing and the like, such as JPEG compression or TIFF compression, by a compressing/expanding section 41. Then, the compressed digital data is output to the memory card drive 42 and is stored in the memory card as well as in the memory 40. It should be noted that when the digital camera 12 is not provided with the memory 40, digital data processed by the digital signal processing section 39 is output to the compressing/expanding section 41 to be stored in the memory card by the memory card drive 42.

The controller 50 causes the compressing/expanding section 41 to perform expansion processing on the image data stored in the memory 40 or the image data stored in the memory card by the memory card drive 42, and causes the display 20 to display the processed image data via the bus 44. When viewing the image data displayed on the display 20 and determining that the image is unnecessary, the user can operate the operation button 23 to erase the same.

When the user operates the zoom switch 14 provided on the top surface of the digital camera 12, the zoom motor drive section 29 is controlled by the controller 50 via the driving circuit 43 to move the photographic lens barrel 71 along the optical axis of the lens (i.e. in a direction of the optical axis passing through the center of the lens). The user can operate the zoom switch 14 to enlarge or reduce the image on the display 20, i.e. to perform a so-called digital zoom operation.

Figure 7:
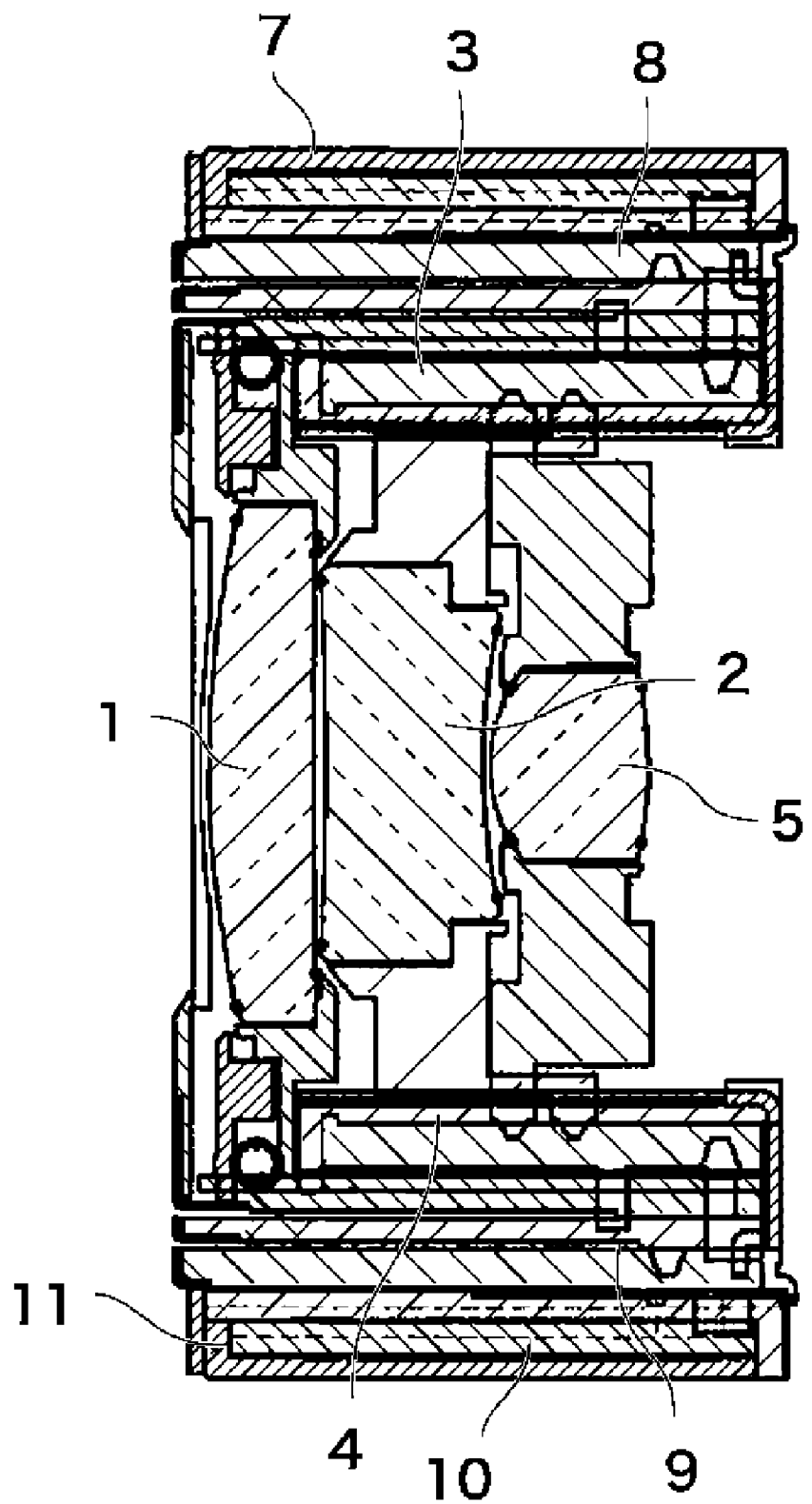
FIG. 7 is a cross-sectional view showing the internal construction of a photographic lens barrel in a retracted state.
Figure 8:
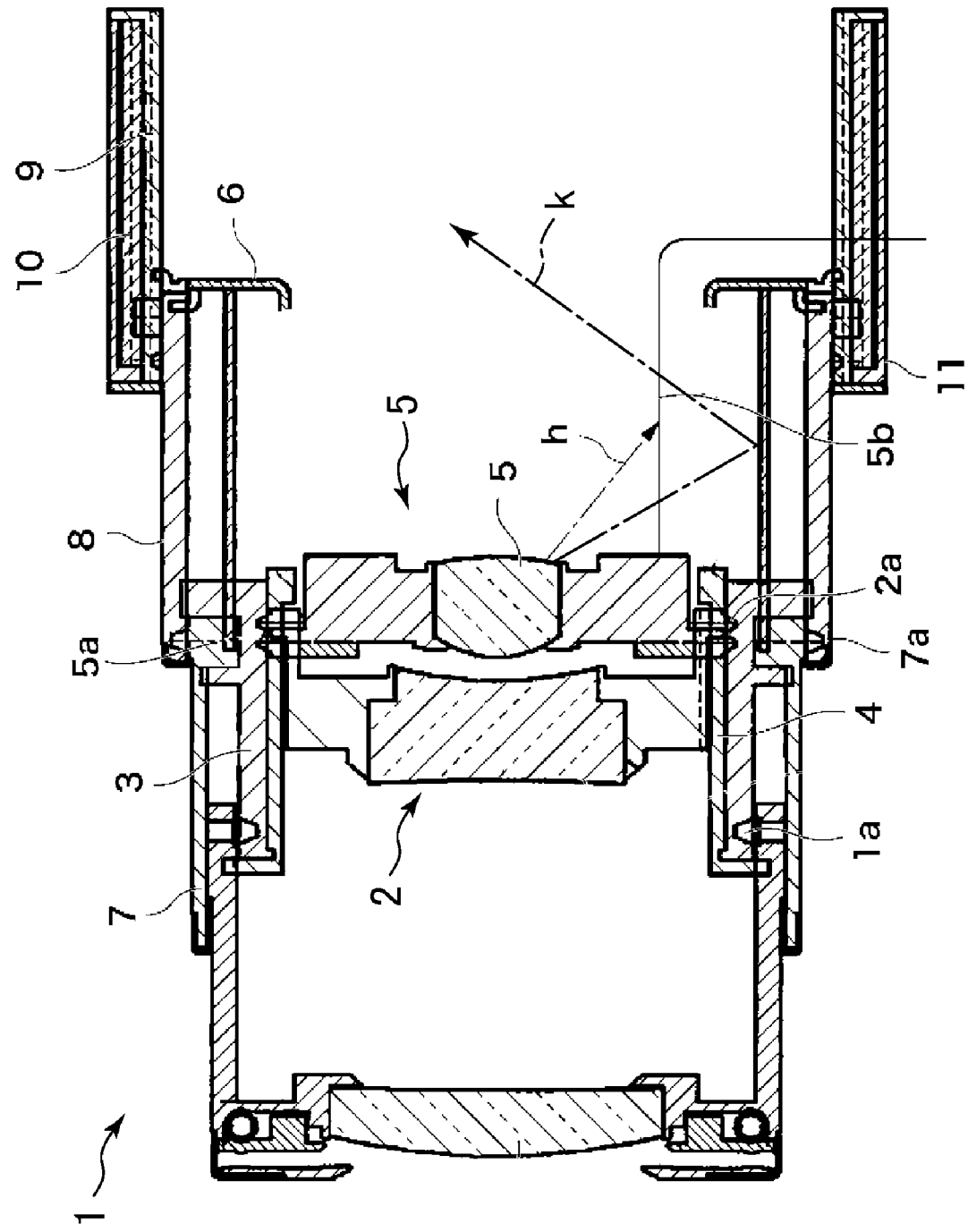
FIG. 8 is a cross-sectional view showing the internal construction of the photographic lens barrel in a shooting-ready state.
Figure 9:
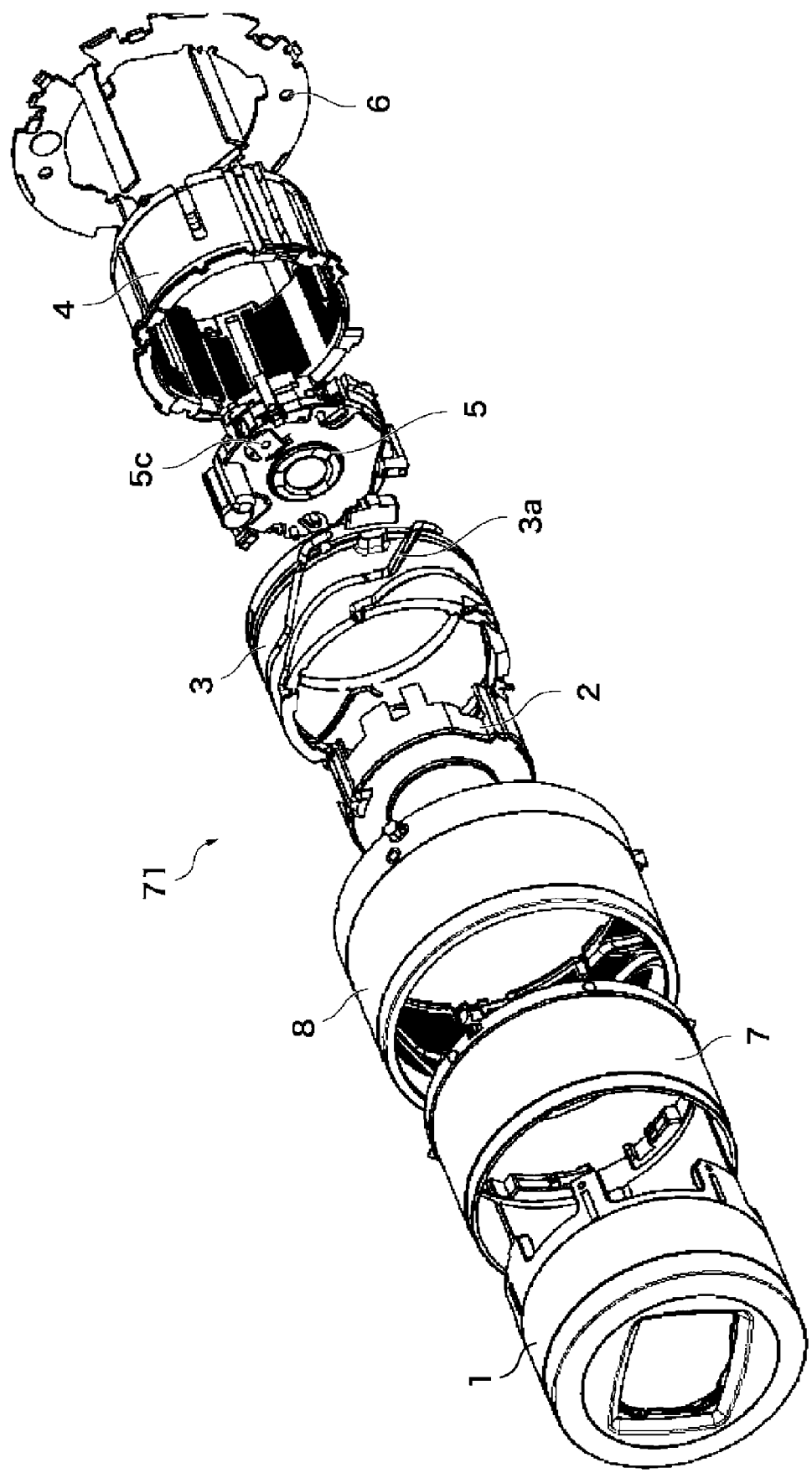
FIG. 9 is an exploded perspective view of the photographic lens barrel.

Next, a description will be given of the construction of a lens group provided in the photographic lens barrel of the digital camera 12. FIG. 7 is a cross-sectional view showing the internal construction of the photographic lens barrel 71 in a retracted state. FIG. 8 is a cross-sectional view showing the internal construction of the photographic lens barrel 71 in a shooting-ready state. FIG. 9 is an exploded perspective view of the photographic lens barrel 71.

The photographic lens unit 1 is formed by a cylindrical housing having an optical lens fitted therein. The photographic lens unit 1 is formed with pin-shaped followers 1a. The second lens unit 2 is formed by a holder having another optical lens fitted therein. The second lens unit 2 is also integrally formed with pin-shaped followers 2a. The pin-shaped followers 2a are formed at respective three locations spaced at angular intervals of 120° in the circumferential direction with respect to the optical axis. Similarly, the third lens unit 5 is formed by a holder having another optical lens fitted therein. The third lens unit 5 is also integrally formed with three pin-shaped followers 5a.

In the outer periphery of a cylindrical unit 3, there are formed first cam grooves 3a followed by the respective followers 1a. Second cam grooves (not shown) are formed in the inner periphery of the cylindrical unit 3 at three circumferential locations on, for causing the respective followers 2a to move in a manner following the same. Similarly, third cam grooves (not shown) are formed in the inner periphery of the cylindrical unit 3 at three circumferential locations, for causing the respective followers 5a to move in a manner following the same.

Further, a rectilinear motion-causing restriction member 4 is engaged with the cylindrical unit 3. The cylindrical unit 3 and the rectilinear motion-causing restriction member 4 are bayonet-coupled to each other, and the cylindrical unit 3 rotates circumferentially along the outer periphery of the rectilinear motion-causing restriction member 4. The photographic lens unit 1 moves along the optical axis with its motion restricted to rectilinear motion by the rectilinear motion-causing restriction member 4. Each of the second lens unit 2 and the third lens unit 5 also has its motion restricted to rectilinear motion by the rectilinear motion-causing restriction member 4.

A second cylindrical unit 7 is fitted on the outer periphery of the photographic lens unit 1. The second cylindrical unit 7 and the cylindrical unit 3 are bayonet-coupled to each other. The second cylindrical unit 7 and the cylindrical unit 3 are movable substantially in unison in the optical axis direction (front-rear direction).

Further, the second cylindrical unit 7 is formed with followers 7a, and the followers 7a follow cam grooves (not shown) formed in the inner periphery of a third cylindrical unit 8. The third cylindrical unit 8 is movable along the optical axis by cam grooves (not shown) formed in the inner periphery of a fixed cam unit 9. The third cylindrical unit 8 directly receives a rotational force from a drive ring 10 fitted on the outer periphery of the fixed cam unit 9. The drive ring 10 is held by a cover member 11. The photographic lens unit 1, the second cylindrical unit 7, and the third cylindrical unit 8 can be retracted in the optical axis direction.

The rectilinear motion-causing restriction member 4 is guided for rectilinear motion by rectilinear motion-causing restriction portions 6a provided on a second rectilinear motion-causing restriction member 6. That is, the photographic lens unit 1 is guided for rectilinear motion by the second rectilinear motion-causing restriction member 6. At the same time, the second cylindrical unit 7 is engaged with the rectilinear motion-causing restriction portions 6b integrally formed on the second rectilinear motion-causing restriction member 6, thereby being guided for rectilinear motion. In general, the inside of the photographic lens barrel is required to be subjected to processing for preventing light from being internally reflected. This is because if there is a portion causing a strong light reflection, a phenomenon generally called ghost occurs to cause an image of rays of light different from an image of an actual object to appear in a photograph (as indicated by a symbol k in FIG. 8).

Figure 10:
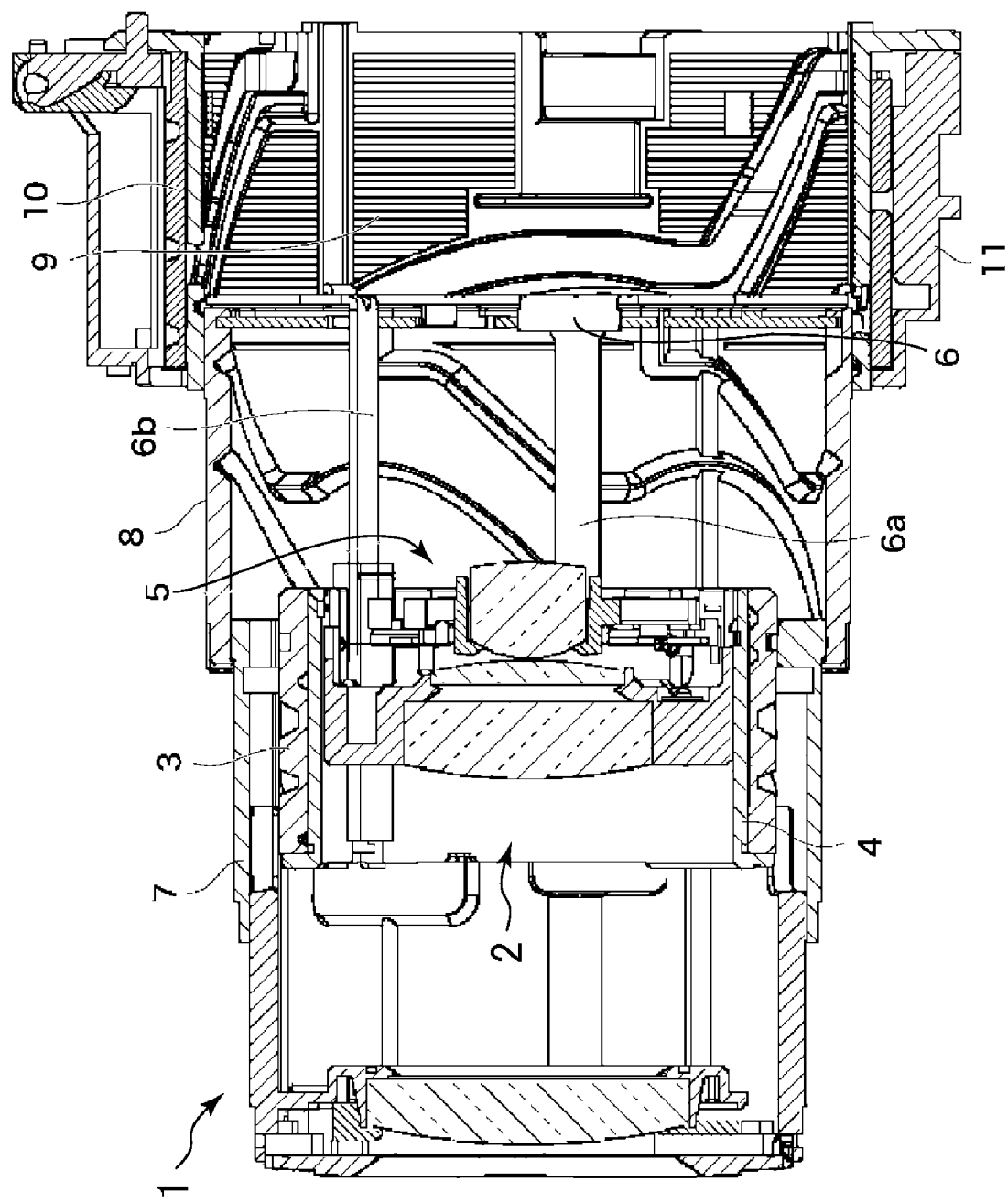
FIG. 10 is a cross-sectional view showing the structure of a photographic lens barrel for comparison.

FIG. 10 is a cross-sectional view showing the structure of a photographic lens barrel for comparison. In this photographic lens barrel, the rectilinear motion-causing restriction member has the rectilinear motion-causing restriction portions 6a exposed toward the inside of the lens barrel. Therefore, if the second rectilinear motion-causing restriction member 6 is made of metal, there is a fear that the rectilinear motion-causing restriction portions 6a (key portions) cause a ghost phenomenon. In such a case, it is a usual practice to subject the rectilinear motion-causing restriction portions 6a to anti-reflection processing. However, since the material of these portions is a metal, sufficient antireflection effects cannot be obtained. In other words, a sufficient solution to the above-mentioned problem has not been provided so far.

Figure 11:
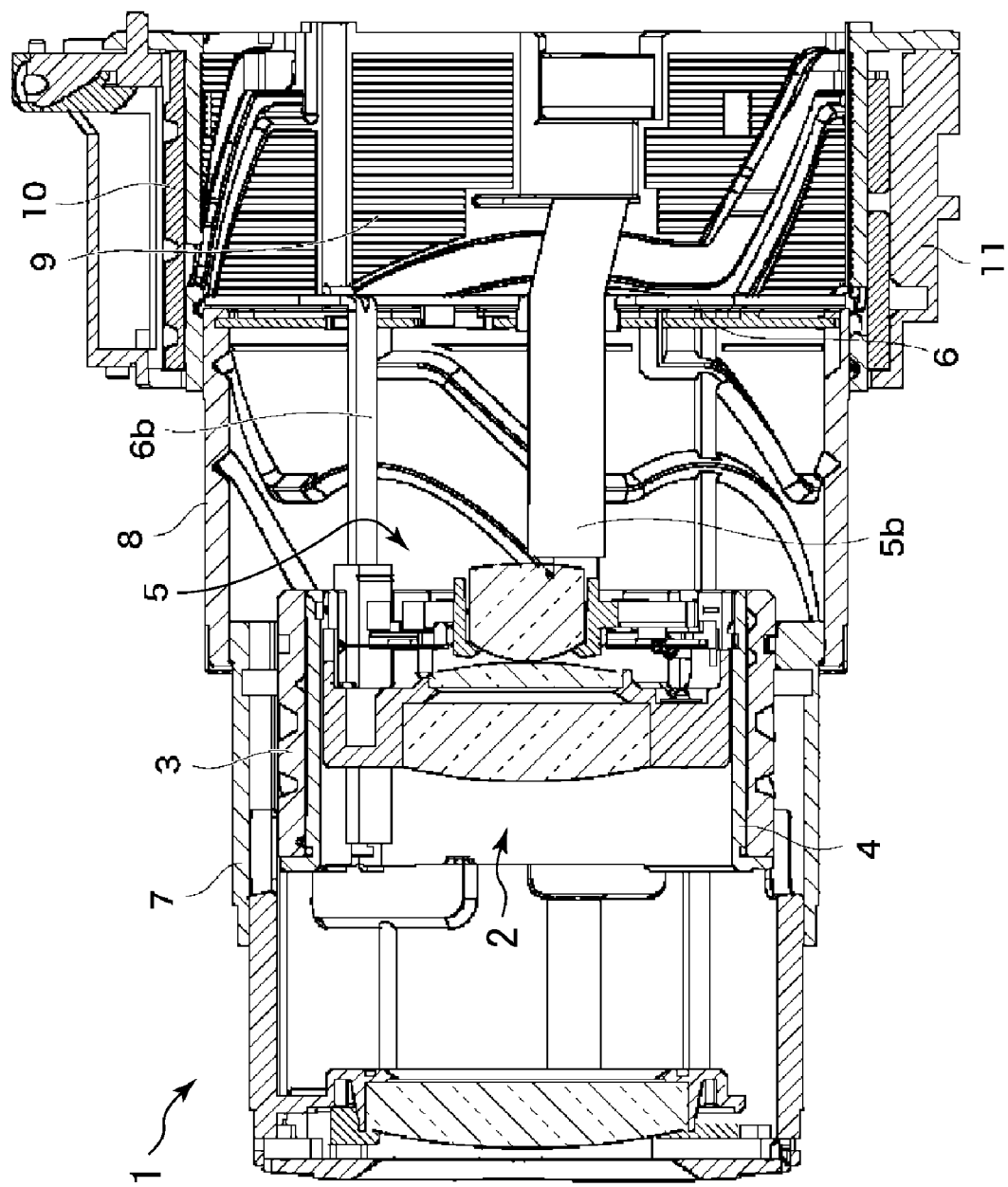
FIG. 11 is a cross-sectional view showing the structure of the photographic lens barrel according to the embodiment.

In contrast, in the present embodiment, the photographic lens barrel has a structure described hereafter. FIG. 11 is a cross-sectional view showing the structure of the photographic lens barrel according to the embodiment. In the photographic lens barrel 71, to drive an actuator section 5c (see FIG. 9) provided on the third lens unit 5, a flexible wiring board as a current carrying member 5b for supplying electric current to the actuator section 5c is connected to the actuator section 5c. The flexible wiring board is disposed in a manner covering the inner surface of one (lower one) of the rectilinear motion-causing restriction members 6a from the optical axis side. It should be noted that the actuator section 5c can incorporate the shutter drive section 32 for driving the shutter 33, the diaphragm drive section 35 for driving the diaphragm 34, a filter drive section, not shown, for changing the amount of light for photographing, an anti-vibration drive section, not shown, for driving an anti-vibration lens, etc. Further, the barrel-inner surface (optical axis-side surface) of the flexible wiring board is subjected to the antireflection processing, which makes it possible to prevent occurrence of the ghost phenomenon (see symbol h in FIG. 8).

Figure 12:
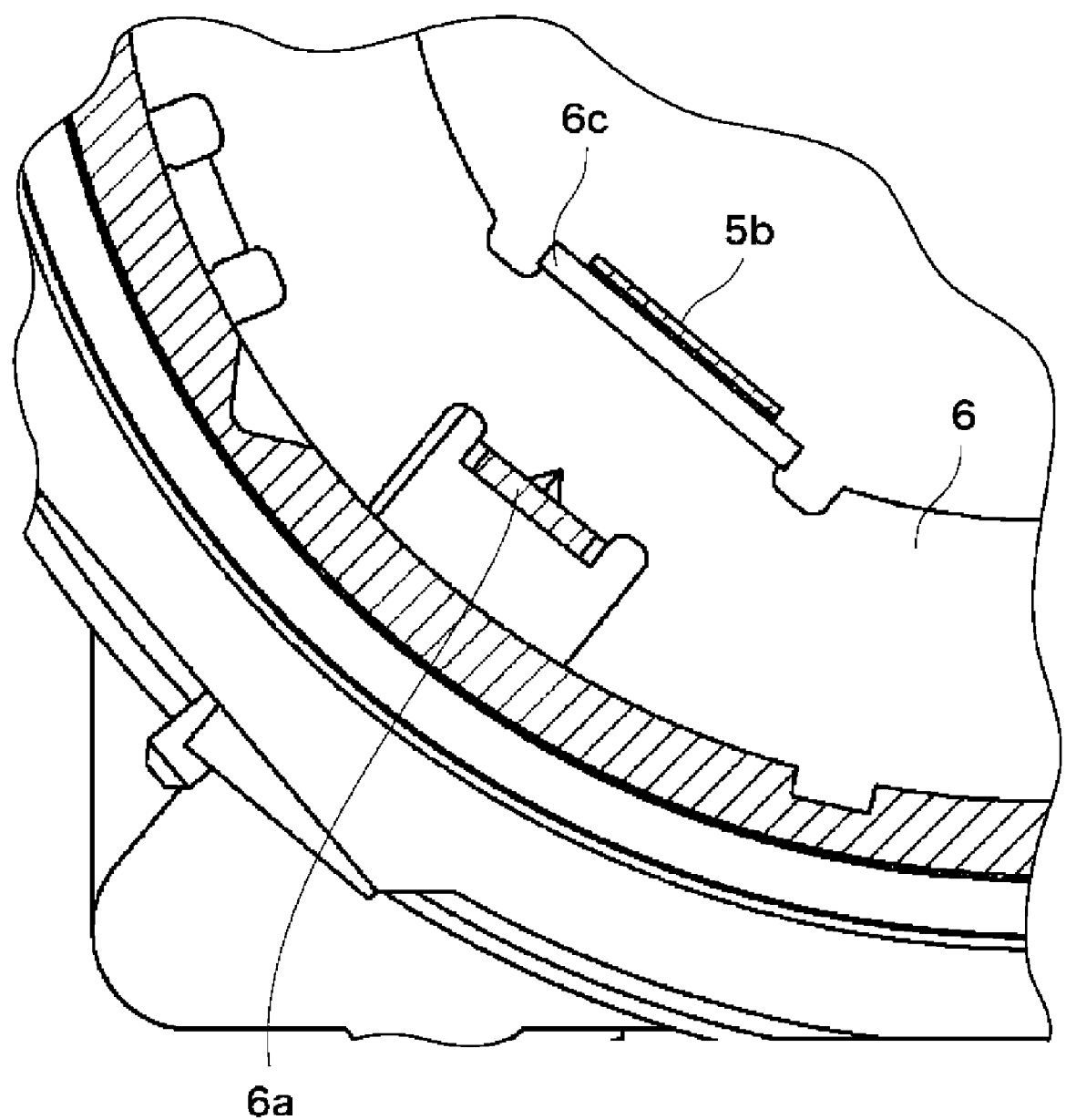
FIG. 12 is a cross-sectional view showing the positional relationship between a current carrying member and a rectilinear motion-causing restriction portion of the photographic lens barrel, as viewed from an optical axis direction.
Figure 13:
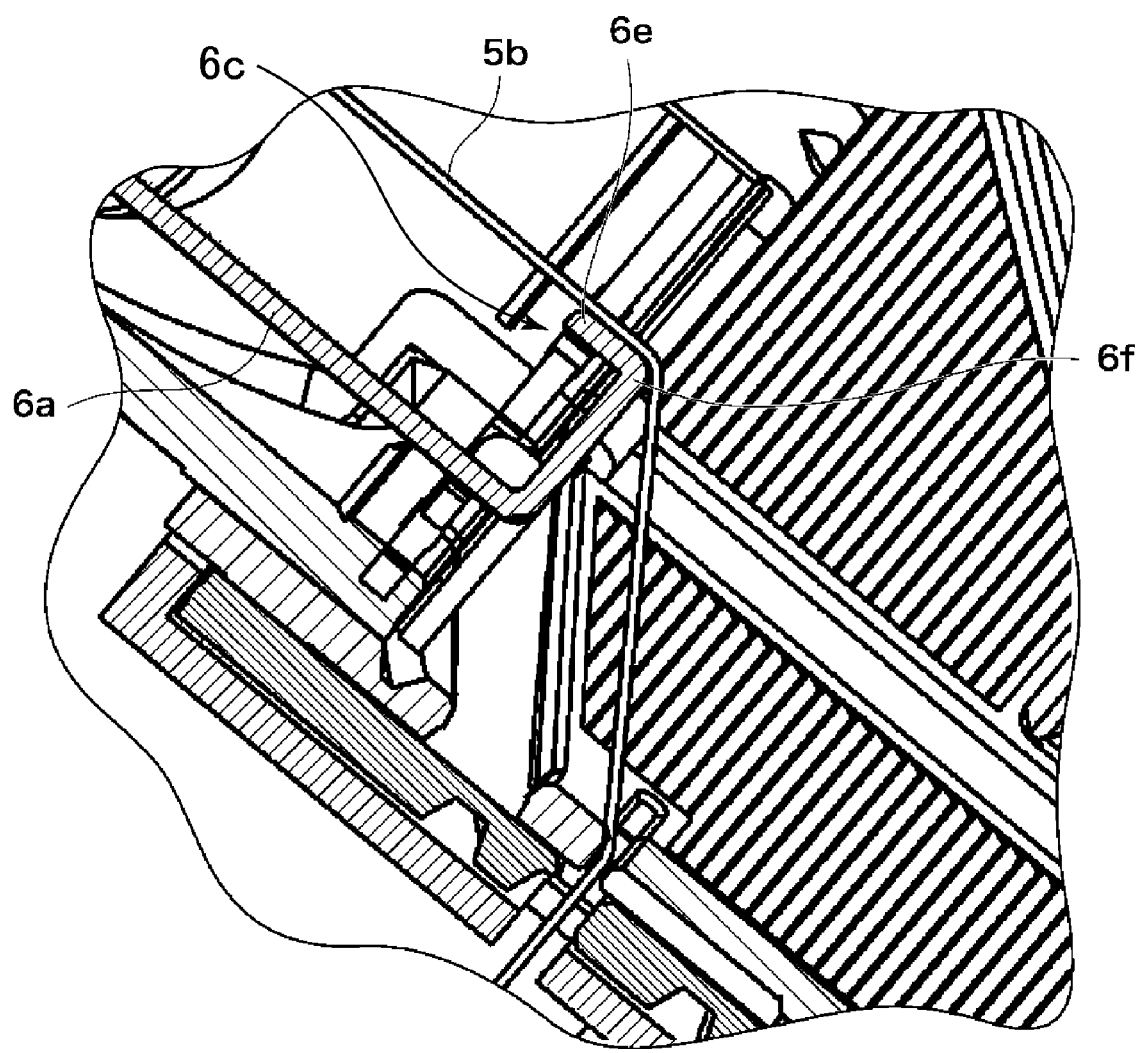
FIG. 13 is a cross-sectional view showing the positional relationship between the current carrying member and the rectilinear motion-causing restriction portion of the photographic lens barrel, as viewed from a direction orthogonal to the optical axis direction.

FIG. 12 is a cross-sectional view showing the positional relationship between the current carrying member 5b and the one (lower one) of the rectilinear motion-causing restriction portions 6a of the photographic lens barrel, as viewed from the optical axis direction. FIG. 13 is a cross-sectional view showing the positional relationship between the current carrying member 5b and the rectilinear motion-causing restriction portion 6a of the photographic lens barrel, as viewed from a direction orthogonal to the optical axis direction.

As shown in FIGS. 12 and 13, the barrel-inner surface (optical axis-side surface) of the rectilinear motion-causing restriction portion 6a provided on the second rectilinear motion-causing restriction member 6 includes a bend portion 6c. The rectilinear motion-causing restriction portion 6a and the bend portion 6c are disposed, as illustrated in FIG. 12, in the same radial direction, more specifically in the same phase concerning the direction of rotation about the axis of the lens barrel. It should be note that they may be in approximately the same phase. Therefore, the current carrying member 5b and the rectilinear motion-causing restriction portion 6a are also in approximately the same phase, and hence it is possible to positively cover the inner side of the rectilinear motion-causing restriction portion 6a along the optical axis with the current carrying member 5b.

When the lens barrel is operated for a so-called zooming operation for changing the optical magnification, the positional relationship between the third lens unit 5 and the second rectilinear motion-causing restriction member 6 in the optical axis direction is changed, so that the current carrying member 5b comes to be moved in a state brought into contact with the bend portion 6c. To prevent the current carrying member 5b from being damaged or broken due to the contact with the bend portion 6c, an upper end face 6e and a lower end face 6f of the bend portion 6c as portions brought into contact with the current carrying member 5b are formed such that they are bent into respective round shapes.

With the above-described construction, the photographic lens barrel constructed is no longer required to have the rectilinear motion-causing restriction portion 6a subjected to the antireflection processing, which reduces the manufacturing costs. In the present embodiment, the portion covered by the current carrying member 5b are only the lower one of the rectilinear motion-causing restriction portions 6a, i.e. the lower one of the rectilinear slide keys. This is because the upper one of the rectilinear motion-causing restriction portions is difficult to cause generation of ghost by the sunlight or like light source. Therefore, the rectilinear motion-causing restriction portions disposed at the other locations are provided with only antireflection coating. Further, although to provide covering on all the rectilinear motion-causing restriction portions has the effect of ghost prevention, the number of current carrying members becomes large, and it is difficult to arrange them. To cover only one of the rectilinear motion-causing restriction members is expected to have a sufficient effect of ghost prevention. It is to be understood that all the rectilinear motion-causing restriction portions may be covered so as to increase the effect.

FIG. 14 is a flowchart of a process of operation of the digital camera provided with the photographic lens barrel 71, from power-on to termination of shooting. A control program for this process stored in the ROM 45 of the controller 50, and is read out for execution by the CPU 46.

When the user turns on the power of the digital camera 12, the CPU 46 gives an instruction to the zoom motor drive section 29 to cause CW (clockwise) rotation of the barrel drive motor 29a (step S1). Then, the CPU 46 causes a predetermined operation to be performed, and after confirming that the photographic lens barrel 71 has been moved to an image-taking position, causes the zoom motor drive section 29 to stop the barrel drive motor 29a. As a consequence, the photographic lens barrel changes from the FIG. 1 state to the FIG. 2 state.

Then, the CPU 46 waits for the user to turn on the release button 13 (step S3). When the release button 13 is turned on, the CPU 46 performs photometry to thereby obtain luminance information on an object (step S4).

The CPU 46 determines whether or not the obtained luminance information indicates a higher luminance than a default luminance (step S5). If the obtained luminance information indicates a higher luminance than the default luminance, the CPU 46 causes a diaphragm 34 to extend into the optical path to change the amount of incident light (step S6).

On the other hand, if the obtained luminance information indicates a lower luminance than the default luminance, the CPU 46 holds the diaphragm aperture 34 in a state retracted from the optical path without carrying out an operation for extending the diaphragm 34 into the optical path, and proceeds to processing in a step S7.

Thereafter, the CPU 46 operates the focus lens unit 30 to move the same to a position where the object is in focus (step S7), and starts an image pickup operation in the position (step S8). Then, the CPU 46 switches the shutter 33 from its open state to its closed state to block incident light (step S9), followed by terminating the image pickup operation (step S10).

Thereafter, the CPU 46 causes the diaphragm 34 to retract from the optical path (step S11) and moves the focus lens unit 30 to its initial position (step S12). Then, the CPU 46 returns to the step S3 and repeatedly carries out the same processing described above until the power is turned off.

According to the image pickup apparatus according to the present embodiment, a rectilinear slide key for restriction to rectilinear motion has an inner surface thereof toward the optical axis covered with a flexible wiring board subjected to antireflection processing. This makes it possible to prevent ghost from being caused by adverse effect-causing rays.

The present invention is not limited to the above described embodiment, but can be modified in various manners based on the subject matter of the present invention, which should not be excluded from within the scope of the present invention insofar as functions as recited in the appended claims or the functions performed by the construction of the above described embodiment can be achieved.

For example, although in the above described embodiment, the compact-type digital camera is described by way of example, this is not limitative, but the present invention can also be applied to a film camera, a digital video camera, a digital SLR (single-lens reflex camera), and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2008-061149 filed Mar. 11, 2008, which is hereby incorporated by reference herein in its entirety.

What is claimed is:

1. A lens barrel that is movable in an optical axis direction, comprising:
   a lens unit configured to be movable in the optical axis direction;
   a rectilinear motion-causing restriction member disposed inside the lens barrel and having a restriction portion for guiding said lens unit along the optical axis direction;
   an actuator section disposed inside the lens barrel; and a current carrying member connected to said actuator section, for supplying electric current thereto, wherein said restriction portion extends along the optical axis direction and is positioned to be exposable to light entering through the lens unit, wherein a surface of said current carrying member has an anti-reflection coating, and wherein said current carrying member is positioned in alignment with said restriction portion, extending along the optical axis direction to cover said restriction portion to prevent the light entering through the lens from reflecting off said restriction portion.

2. The lens barrel according to claim 1, wherein:

said current-carrying member is a flexible wiring board, and said rectilinear motion-causing restriction member has a bent portion disposed in alignment with said restriction portion, for guiding said current carrying member.

3. The lens barrel according to claim 1, wherein said actuator section includes at least one of a shutter drive section for driving a shutter, a diaphragm drive section for driving a diaphragm, a filter drive section for changing an amount of light for photographing, or an anti-vibration drive section for driving an anti-vibration lens.

4. The lens barrel according to claim 1, wherein said restriction portion is beam-shaped.

5. An image pickup apparatus comprising:

a lens barrel that is movable in an optical axis direction, wherein said lens barrel comprises:

a lens unit configured to be movable in the optical axis direction;

a rectilinear motion-causing restriction member disposed inside the lens barrel, and having a restriction portion for guiding said lens unit along the optical axis direction;

an actuator section disposed inside the lens barrel; and a current carrying member connected to said actuator section, for supplying electric current thereto, wherein said restriction portion extends along the optical axis direction and is positioned to be exposable to light entering through the lens unit, wherein a surface of said current carrying member has an anti-reflection coating, and wherein said current carrying member is positioned in alignment with said restriction portion, extending along the optical axis direction to cover said restriction portion to prevent the light entering through the lens from reflecting off said restriction portion.

6. The image pickup apparatus according to claim 5, wherein said restriction portion is beam-shaped.

* * * * *